United States Patent
Yoo et al.

(10) Patent No.: US 10,297,078 B2
(45) Date of Patent: May 21, 2019

(54) METHOD AND APPARATUS FOR RENDERING CURVE

(71) Applicant: Samsung Electronics Co., Ltd., Suwon-si, Gyeonggi-do (KR)

(72) Inventors: Jeong-joon Yoo, Hwaseong-si (KR); Sundeep Krishnadasan, Karnataka (IN); Soo-jung Ryu, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/652,610

(22) Filed: Jul. 18, 2017

(65) Prior Publication Data

US 2018/0144544 A1 May 24, 2018

(30) Foreign Application Priority Data

Nov. 21, 2016 (KR) .................. 10-2016-0154882

(51) Int. Cl.
| | |
|---|---|
| *G06T 1/20* | (2006.01) |
| *G06T 17/00* | (2006.01) |
| *G06T 17/20* | (2006.01) |
| *G06T 15/00* | (2011.01) |
| *G06T 11/20* | (2006.01) |

(52) U.S. Cl.
CPC ............ *G06T 17/20* (2013.01); *G06T 11/203* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 6,057,848 | A * | 5/2000 | Goel .................. | G06T 15/04 345/423 |
| 6,147,767 | A * | 11/2000 | Petteruti ............ | G06K 15/00 358/1.18 |
| 6,441,823 | B1 * | 8/2002 | Ananya .............. | G06T 11/203 345/442 |
| 7,564,459 | B2 | 7/2009 | Loop et al. | |
| 7,868,887 | B1 * | 1/2011 | Yhann ................ | G06T 11/203 345/442 |
| 8,072,452 | B1 | 12/2011 | Brown | |

(Continued)

FOREIGN PATENT DOCUMENTS

| | | |
|---|---|---|
| JP | H11066328 A | 3/1999 |
| KR | 2015/0095516 A | 8/2015 |
| KR | 2016/0025277 A | 3/2016 |

OTHER PUBLICATIONS

Charles Loop et al., "Resolution independent curve rendering using programmable graphics hardware," Jul. 2005, ACM Transactions on Graphics (TOG), Proceedings of ACM Siggraph 2005, vol. 24, Issue 3, pp. 1000-1009.

(Continued)

*Primary Examiner* — Martin Mushambo
(74) *Attorney, Agent, or Firm* — Harness, Dickey & Pierce, P.L.C.

(57) ABSTRACT

Provided is a method of rendering a curve. The method includes determining a tessellation level of dividing a curve based on a control point of the curve, generating at least one triangle and at least two first sub-curves corresponding to the curve based on the tessellation level, and rendering the at least two first sub-curves and the at least one triangle.

19 Claims, 13 Drawing Sheets

(56) References Cited

U.S. PATENT DOCUMENTS

| | | | |
|---|---|---|---|
| 8,120,607 B1* | 2/2012 | Legakis | G06T 17/20 345/423 |
| 8,351,716 B2 | 1/2013 | Parsons et al. | |
| 8,471,852 B1* | 6/2013 | Bunnell | G06T 17/30 345/423 |
| 8,643,644 B2 | 2/2014 | Wei et al. | |
| 8,941,662 B2 | 1/2015 | Pfeifle | |
| 9,105,125 B2 | 8/2015 | Martin et al. | |
| 9,922,442 B2* | 3/2018 | Shreiner | G06T 15/005 |
| 2003/0117405 A1* | 6/2003 | Hubrecht | G06T 17/00 345/543 |
| 2004/0085312 A1* | 5/2004 | Buchner | G06T 17/20 345/423 |
| 2004/0090437 A1* | 5/2004 | Uesaki | G06T 17/30 345/420 |
| 2004/0095351 A1* | 5/2004 | Ananya | G06T 11/203 345/442 |
| 2005/0168778 A1* | 8/2005 | Abe | G06F 17/211 358/1.18 |
| 2009/0237401 A1* | 9/2009 | Wei | G06T 11/203 345/423 |
| 2011/0175911 A1* | 7/2011 | Loop | G06T 15/005 345/423 |
| 2013/0166632 A1* | 6/2013 | Yamasaki | G06F 9/505 709/203 |
| 2013/0329972 A1* | 12/2013 | Zhang | G06T 5/00 382/128 |
| 2014/0022264 A1* | 1/2014 | Shreiner | G06T 15/005 345/520 |
| 2014/0184599 A1* | 7/2014 | Quilot | G06T 17/30 345/423 |
| 2014/0320523 A1 | 10/2014 | Hodsdon et al. | |
| 2015/0228094 A1 | 8/2015 | Yoo et al. | |
| 2015/0310636 A1 | 10/2015 | Yoo et al. | |
| 2016/0042561 A1* | 2/2016 | Yoo | G06T 11/203 345/426 |
| 2016/0063760 A1* | 3/2016 | Woo | G06T 17/20 345/423 |
| 2016/0104458 A1* | 4/2016 | Kim | G06T 15/005 345/423 |

OTHER PUBLICATIONS

Mark J. Kilgard et al. "GPU-accelerated Path Rendering". Computer Graphics Proceedings, Annual Conference Series. ACM Siggraph ASIA 2012. 2012. pp. 1-10.

Francisco Ganacim et al. "Massively-Parallel Vector Graphics". IMPA—Instituto Nacional de Matemática Pura e Aplicada. 2014.

Extended European Search Report dated Mar. 13, 2018 issued in corresponding European Application No. 17196309.3.

* cited by examiner

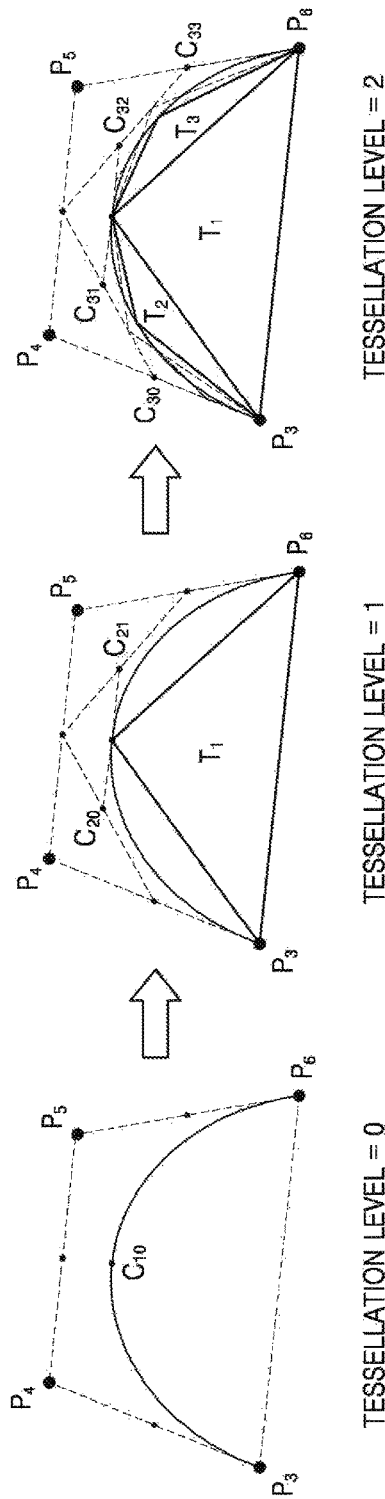

FIG. 7
TESSELLATION LEVEL = 0
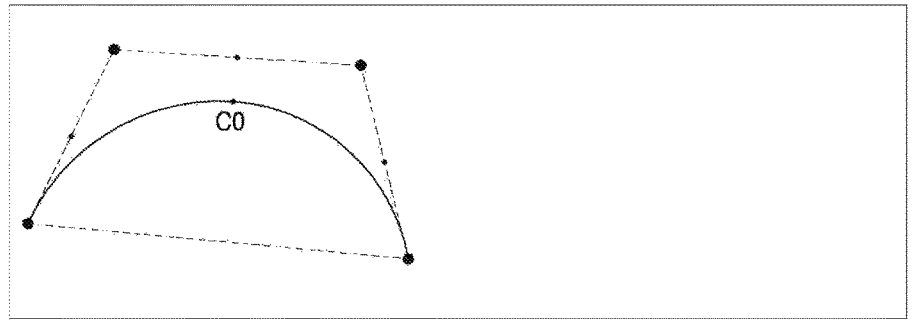
TESSELLATION LEVEL = 1
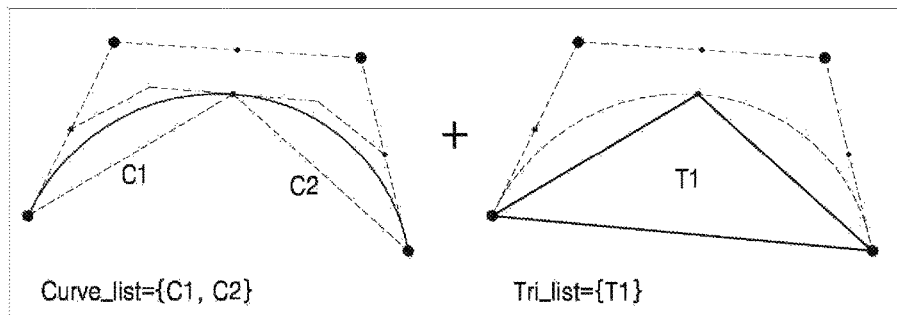
TESSELLATION LEVEL = 2
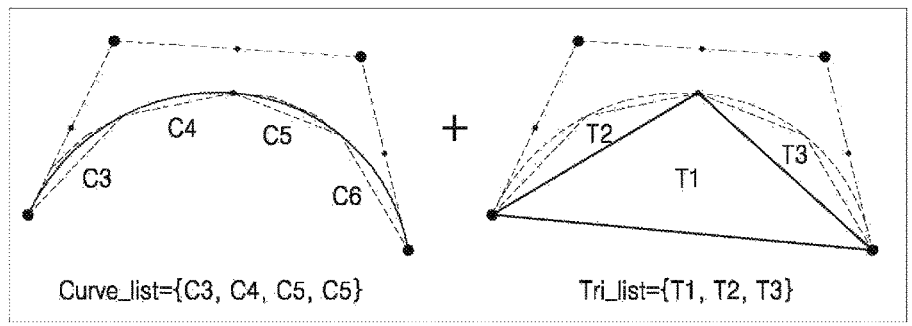

METHOD AND APPARATUS FOR RENDERING CURVE

CROSS-REFERENCE TO RELATED APPLICATION

This application claims the benefit of Korean Patent Application No. 10-2016-0154882, filed on Nov. 21, 2016, in the Korean Intellectual Property Office, the disclosure of which is incorporated herein in its entirety by reference.

BACKGROUND

Inventive concepts relates to a method and apparatus for rendering a curve.

Research has been conducted on a method of improving the acceleration performance of a graphics processing unit (GPU) in vector graphics or path rendering performance. For path rendering, input data may include a combination of vertexes and commands, and may not include triangles. Thus, improving the acceleration performance of a GPU in the case of performing path rendering may be difficult.

SUMMARY

Inventive concepts provide a method and apparatus for rendering a curve. Additionally, inventive concepts provide a computer-readable recording medium that stores a program that performs the above method when executed by a computer. However, inventive concepts are not limited thereto and may also provide other technical solutions.

According to an example embodiment of inventive concepts, there is provided a method of rendering a curve, the method including determining a tessellation level of dividing a curve based on a control point of the curve, generating at least one triangle and at least two first sub-curves corresponding to the curve based on the tessellation level, and rendering the at least two first sub-curves and the at least one triangle.

According to another example embodiment of inventive concepts, there is provided a method of rendering a curve, the method including determining a tessellation level based on a resource usage ratio of a central processing unit (CPU) and a resource usage ratio of a graphics processing unit (GPU), generating primitive data corresponding to a curve in response to the tessellation level, and rendering the curve by using the primitive data According to another example embodiment of inventive concepts, there is provided an apparatus for rendering a curve, the apparatus including a processor. The processor is configured to determine a tessellation level of dividing a curve based on a control point of the curve, and generate at least one triangle and at least two first sub-curves corresponding to the curve based on the tessellation level.

According to another example embodiment of inventive concepts, there is provided an apparatus for rendering a curve, the apparatus including a processor. The processor is configured to determine a tessellation level based on a resource usage ratio of a central processing unit (CPU) and a resource usage ratio of a graphics processing unit (GPU), and generate primitive data corresponding to a curve based on the tessellation level.

According to another example embodiment of inventive concepts, there is provided a system for rendering a curve, the system including a central processing unit (CPU), and a graphics processing unit (GPU). The CPU is configured to determine a tessellation level based on a resource usage ratio of the CPU and a resource usage ratio of the GPU, at least one of the CPU and the GPU is configured to generate primitive data corresponding to a curve based on the tessellation level. The GPU is configured to render the curve by using the primitive data.

According to another aspect of inventive concepts, there is provided a method of rendering a curve, the method including determining a first tessellation level in response to a resource usage ratio of a first processing unit being greater than a resource usage ratio of a second processing unit times a scaling value, the scaling value being a real number greater than 0, and determining a second tessellation level, different from the first tessellation level, in response to the resource usage ratio of the first processing unit being less than or equal to the resource usage ratio of the second processing unit times the scaling value.

BRIEF DESCRIPTION OF THE DRAWINGS

Example embodiments of inventive concepts will be more clearly understood from the following detailed description taken in conjunction with the accompanying drawings in which:

FIG. 4 is a diagram illustrating an example of a tessellation level according to an embodiment;

FIG. 7 is a diagram illustrating an example in which a processor divides a curve based on a tessellation level according to an embodiment;

DETAILED DESCRIPTION OF THE EMBODIMENTS

The terms used in the embodiments are those general terms currently widely used in the art in consideration of functions in regard to inventive concepts, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of inventive concepts. Thus, the terms used herein should be understood not as simple names but based on the meaning of the terms and the overall description of inventive concepts.

Throughout the specification, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Hereinafter, embodiments of inventive concepts will be described in detail with reference to the accompanying drawings so that those of ordinary skill in the art may easily implement the embodiments. In this regard, inventive concepts may have different forms and should not be construed as being limited to the descriptions set forth herein.

Hereinafter, embodiments of inventive concepts will be described in detail with reference to the accompanying drawings.

Figure 1:
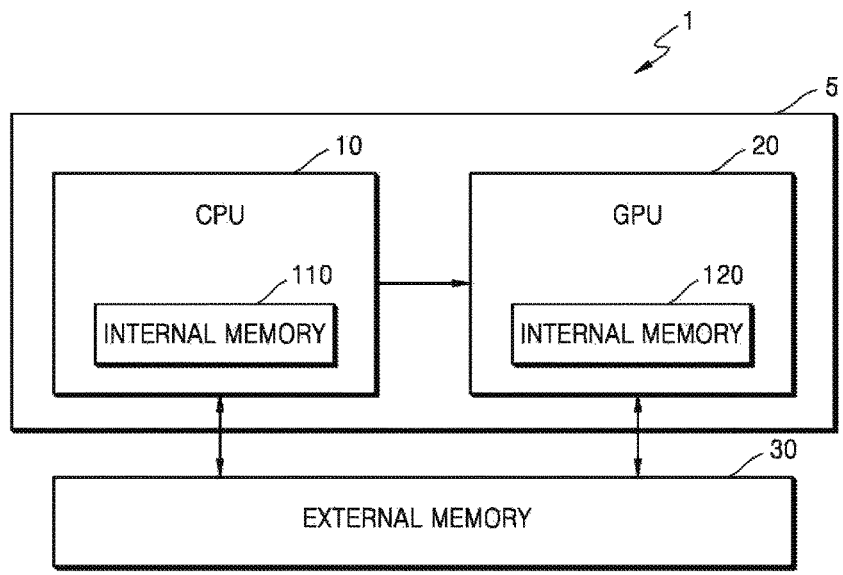
FIG. 1 is a block diagram illustrating an example of a graphics processing system according to an embodiment.

FIG. 1 is a block diagram illustrating an example of a graphics processing system according to an example embodiment.

Referring to FIG. 1, a graphics processing system 1 may include processing units 5. The processing units 5 may include a central processing unit (CPU) 10, a graphics processing unit (GPU) 20. The graphics processing system 1 may include an external memory 30. Also, the CPU 10 may include a CPU internal memory 110, and the GPU 20 may include a GPU internal memory 120.

The CPU 10 may generate a draw call or draw command to be transmitted to the GPU 20 by using path data. Herein, the path may refer to an element of an object to be rendered. For example, the object may include a closed path or a closed polygon formed by connecting one or more paths. For example, the path may correspond to a line or a curve.

The GPU 20 may receive the draw call and perform path rendering by using primitive data stored in the external memory 30 or the CPU internal memory 110. For example, the GPU 20 may calculate a color value of each of a plurality of pixels included in a frame by using the primitive data. Herein, the frame may correspond to an image to be displayed on a screen, and an image may be formed by setting a color for each of the pixels included in the frame.

For example, the GPU 20 may include a vertex shader, a rasterizer, a fragment shader, a pixel shader, and/or a frame buffer.

The primitive may refer to an element for rendering. For example, a path may include one or more consecutive primitives, and a primitive such as a curve may be divided into several primitives.

The external memory 30 may store information or data necessary for operation of the CPU 10 and the GPU 20 and store data processing results of the CPU 10 and the GPU 20. For example, the external memory 30 may include a dynamic random-access memory (DRAM).

The CPU internal memory 110 and/or the GPU internal memory 120 may store data expected to be frequently or immediately used by the CPU 10 and the GPU 20. For example, the CPU internal memory 110 and/or the GPU internal memory 120 may include cache memories.

The GPU 20 may perform rendering on a curve by using a Loop-Blinn method. Herein, the Loop-Blinn method may be a method of determining, through a Loop-Blinn equation, whether each of the pixels included in a triangle including control points of the curve is included in the curve and may refer to a method based on the contents of "Resolution Independent Curve Rendering using Programmable Graphics Hardware" co-authored by Charles Loop and Jim Blinn. Thus, the operation amount of the GPU 20 may increase as the number of pixels to which the Loop-Blinn equation is to apply increases.

The CPU 10 may perform tessellation on a curve to be rendered. Herein, the tessellation may refer to a process of dividing a curve into a plurality of sub-curves. Thus, the operation amount of the CPU 10 may increase as the number of tessellations on a curve increases.

In a method of rendering a curve according to an embodiment, a resource usage ratio $U_{CPU}$ of the CPU 10 and a resource usage ratio $U_{GPU}$ of the GPU 20 may be considered to determine a tessellation level. Herein, the resource usage ratio may refer to the ratio of the currently-used resource to the total resource capacity of the CPU 10 or the GPU 20. For example, in a method of rendering a curve according to an embodiment, a tessellation level may be determined adaptively according to a resource usage ratio $U_{CPU}$ of the CPU 10 and a resource usage ratio $U_{GPU}$ of the GPU 20. Thus, the occurrence of an overload in the CPU 10 and the GPU 20 may be prevented, mitigated, or reduced in likelihood of occurrence, and the curve rendering may be performed at high speed.

Hereinafter, examples of a method of rendering a curve will be described with reference to FIGS. 2 to 10.

Figure 2:
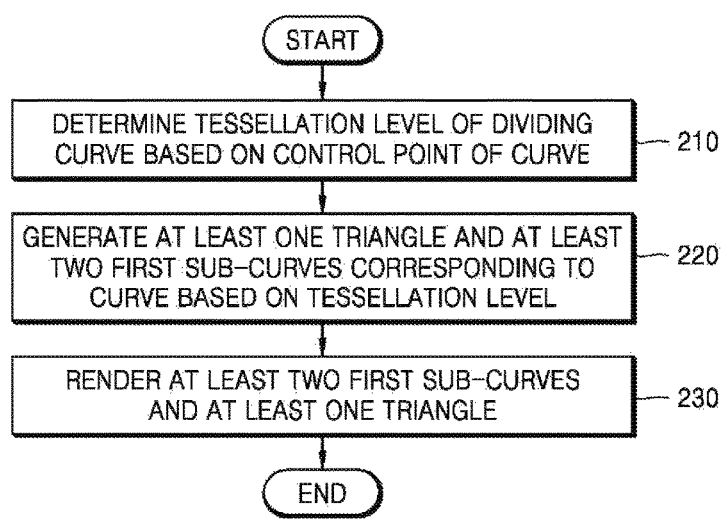
FIG. 2 is a flow diagram illustrating an example of a method of rendering a curve according to an embodiment.

FIG. 2 is a flow diagram illustrating an example of a method of rendering a curve according to an embodiment.

The method of rendering a curve illustrated in FIG. 2 may be performed by the CPU 10 and/or may be performed by the GPU 20. Also, the method of rendering a curve illustrated in FIG. 2 may be performed by a hardware accelerator. For example, the hardware accelerator may be embedded in the CPU 10 or the GPU 20 or may be provided as an independent device separate from the CPU 10 or the GPU 20.

Hereinafter, for convenience of description, a processor is assumed to perform the method of FIG. 2. The processor may be included in the CPU 10, the GPU 20, or the hardware accelerator.

In operation 210, the processor may determine a tessellation level of dividing a curve based on a control point of the curve.

The curve may be implemented by a plurality of control points. For example, the curve may include a quadratic curve implemented by three control points or a cubic curve implemented by four control points.

The tessellation level may correspond to the number of times of dividing the curve. For example, when the tessellation level is 2, the processor divides the curve two times. For example, the processor may divide the curve based on the control point of the curve. For example, when the tessellation level is 1, the curve may be divided into two sub-curves and thus one triangle may be generated. Herein, two of the vertexes of the triangle may be identical to, or may correspond to, two of the control points of the curve.

The processor may determine the tessellation level in consideration of the resource usage ratio $U_{CPU}$ of the CPU 10 and the resource usage ratio $U_{GPU}$ of the GPU 20. In an embodiment, the processor may increase the tessellation level when the resource usage ratio $U_{CPU}$ of the CPU 10 is greater than the resource usage ratio $U_{GPU}$ of the GPU 20. Also, the processor may decrease the tessellation level when the resource usage ratio $U_{CPU}$ of the CPU 10 is less than or equal to the resource usage ratio $U_{GPU}$ of the GPU 20.

When or if a plurality of curves are sequentially input, the processor may determine the tessellation level of the next-input curve in consideration of the tessellation level of the previously-input curve. For example, when the tessellation level of a first curve is determined and then the tessellation level of a second curve is determined, the processor may determine the tessellation level of the second curve according to increasing or decreasing the tessellation level of the first curve by a desired (or alternatively, predetermined) value. Herein, the desired (or alternatively, predetermined) value may be 0 or a natural number greater than or equal to 1.

Hereinafter, an example of determining a tessellation level by a processor will be described with reference to FIGS. 3 to 6.

Figure 3A:
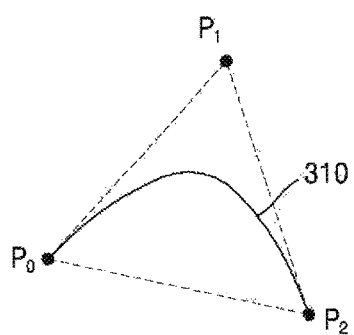
FIGS. 3A and 3B are diagrams illustrating examples of a curve according to an embodiment.
Figure 3B:
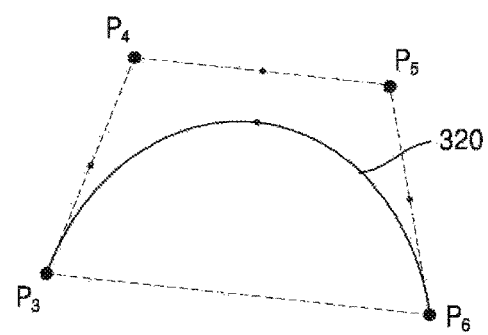

FIGS. 3A and 3B are diagrams illustrating examples of a curve according to an embodiment.

FIG. 3A illustrates an example of a quadratic curve 310 implemented by three control points. FIG. 3B illustrates an example of a cubic curve 320 implemented by four control points.

Referring to FIG. 3A, a curve 310 may be implemented by a control point $P_0$, a control point $P_2$, and a control point $P_1$. The control point $P_0$ may determine the start point of the curve 310; the control point $P_2$ may determine the end point of the curve 310, and the control point $P_1$ may determine the shape of the curve 310. Also, referring to FIG. 3B, a curve 320 may be implemented by a control point $P_3$ determining the start point of the curve 320, a control point $P_6$ determining the end point of the curve 320, and control points $P_4$ and $P_5$ determining the shape of the curve 320.

The path data may include data about the geometry of a path and data about a style of the path. For example, the path data may include information about coordinates of each of a plurality of vertexes included in the path and commands for constructing the path by combining the vertexes. Herein, the vertexes may include the vertex corresponding to the start point of the path and the vertex corresponding to the end point of the path. When or if the path is a curve, a control point determining the shape of the curve may be further included. The path data may include information about the color in which the path is to be represented. Thus, by referring to the path data, the processor may determine whether the path is a line or a curve, and when the path is a curve, the processor may be determined what control points implement the curve.

By referring to the path data, the processor may determine the control points corresponding to the curves 310 and 320. Thus, the processor may divide the curves 310 and 320 based on the control points of the curves 310 and 320. In an example embodiment, the processor may divide the curve such that two of the vertexes of the triangle generated by dividing the curves 310 and 320 are identical to two of the control points of the curves 310 and 320.

Hereinafter, a tessellation level determined by a processor will be described in detail with reference to FIG. 4.

FIG. 4 is a diagram illustrating an example of a tessellation level according to an embodiment.

FIG. 4 illustrates an example of a case where the tessellation level is 0, 1, or 2. The tessellation level may correspond to the number of times of dividing a curve $C_{10}$. For example, when or if the tessellation level is 0, the curve $C_{10}$ may not be divided; when or if the tessellation level is 1, the curve $C_{10}$ may be divided one time; and when or if the tessellation level is 2, the curve $C_{10}$ may be divided two times.

Referring to FIG. 4, when the tessellation level is 1, the curve $C_{10}$ may be divided one time. In other words, the curve $C_{10}$ may be divided into two first sub-curves $C_{20}$ and $C_{21}$. Also, one triangle $T_1$ may be generated according as the curve $C_{10}$ is divided. Accordingly, two vertexes of the triangle $T_1$ may be identical to control points $P_3$ and $P_6$ of the curve $C_{10}$.

When or if the tessellation level is 2, the curve $C_{10}$ may be divided two times For example, the curve $C_{10}$ may be divided into four second sub-curves $C_{30}$, $C_{31}$, $C_{32}$, and $C_{33}$. In an embodiment, the first sub-curve $C_{20}$ may be divided into the second sub-curves $C_{30}$ and $C_{31}$, and the first sub-curve $C_{21}$ may be divided into the second sub-curves $C_{32}$ and $C_{33}$. Three triangles $T_1$, $T_2$, and $T_3$ may be generated according as the curve $C_{10}$ is divided two times. Accordingly, two vertexes of the triangle $T_1$ may be identical to control points $P_3$ and $P_6$ of the curve $C_{10}$ as described above.

Although not illustrated in FIG. 4, when or if the tessellation level is 3, the curve $C_{10}$ may be divided three times according to the above method and thus eight third sub-curves and seven triangles may be generated. In summary, when the tessellation level is N (N is a natural number greater than or equal to 2), at least one triangle and at least two Nth sub-curves corresponding to an (N−1)th sub-curve may be generated.

When or if the tessellation is performed by the CPU 10, the operation amount of the CPU 10 may increase as the tessellation level increases. For example, an overload may occur in the CPU 10. However, the operation amount of the GPU 20 may increase as the tessellation level decreases. Thus, the processor may determine the tessellation level in consideration of the resource usage ratio $U_{CPU}$ of the CPU 10 and the resource usage ratio $U_{GPU}$ of the GPU 20.

Hereinafter, an example of determining a tessellation level by a processor will be described in detail with reference to FIG. 5.

Figure 5:
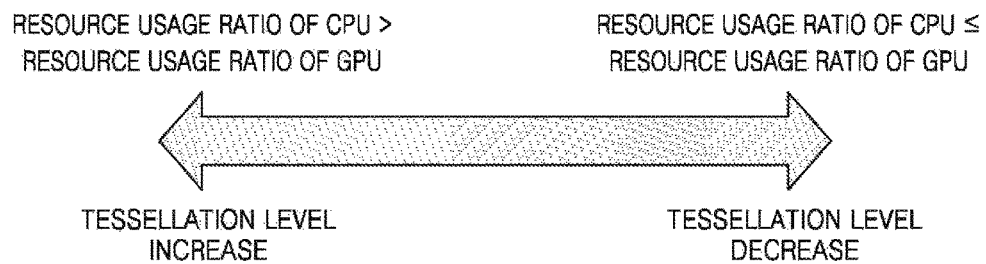
FIG. 5 is a diagram illustrating an example in which a processor determines a tessellation level in consideration of a resource usage ratio $U_{CPU}$ of a central processing unit (CPU) and a resource usage ratio $U_{GPU}$ of a graphics processing unit (GPU) according to an embodiment.

FIG. 5 is a diagram illustrating an example in which a processor determines a tessellation level in consideration of a resource usage ratio $U_{CPU}$ of a CPU and a resource usage ratio $U_{GPU}$ of a GPU according to an embodiment.

Referring to FIG. 5, the processor may decrease the tessellation level when the resource usage ratio $U_{CPU}$ of the CPU 10 is greater than the resource usage ratio $U_{GPU}$ of the GPU 20. Alternatively, the processor may increase the tessellation level when the resource usage ratio $U_{CPU}$ of the CPU 10 is smaller than or equal to the resource usage ratio $U_{GPU}$ of the GPU 20.

For example, the processor may increase or decrease the tessellation level based on Equation 1 below. That is, when Equation 1 is satisfied, the processor may decrease the tessellation level, and when Equation 1 is not satisfied, the processor may increase the tessellation level.

$$U_{CPU} U_{GPU} * \alpha \qquad \text{Equation 1}$$

In Equation 1, $U_{CPU}$ denotes the resource usage ratio of the CPU 10, and $U_{GPU}$ denotes the resource usage ratio of the GPU 20. Also, a denotes a value that may be determined according to the applications and characteristics of the system including the CPU 10 and the GPU 20 and/or may be set by a user. For example, α may be a scaling value. For example, $U_{CPU}$ and $U_{GPU}$ may be real numbers between 0 and 1, and a may be a real number greater than 0.

In order to support real-time processing in the CPU 10, the resource usage ratio of the CPU 10 may need to be or be desired to be maintained below a certain ratio. Accordingly, when or if a is set to a real numberless than 1, the resource usage ratio of the CPU 10 may be maintained to be smaller than the resource usage ratio of the GPU 20. On the other hand, in order to support real-time processing of 3-dimensional (3D) graphics in the GPU 20, the resource usage ratio of the GPU 20 may need to be maintained below a certain ratio. In this case, when α is set to a real number greater than or equal to 1, the resource usage ratio of the GPU 20 may be maintained to be smaller than the resource usage ratio of the CPU 10. The value of a may be changed dynamically according to applications instead of being fixed or specified in the system.

When or if Equation 1 is satisfied, the processor may decrease the tessellation level by one from a reference value. Alternatively, when or if Equation 1 is not satisfied, the processor may increase the tessellation level by one from a reference value. In Equation 1, when or if the resource usage ratio $U_{GPU}$ of the GPU 20 decreases rapidly, the processor may change the tessellation level to 0 instead of decreasing the tessellation level by one from a reference value. Herein, the reference value may refer to the tessellation level of the previous curve.

Hereinafter, an example of determining a tessellation level based on a reference value by a processor will be described with reference to FIG. 6.

Figure 6:
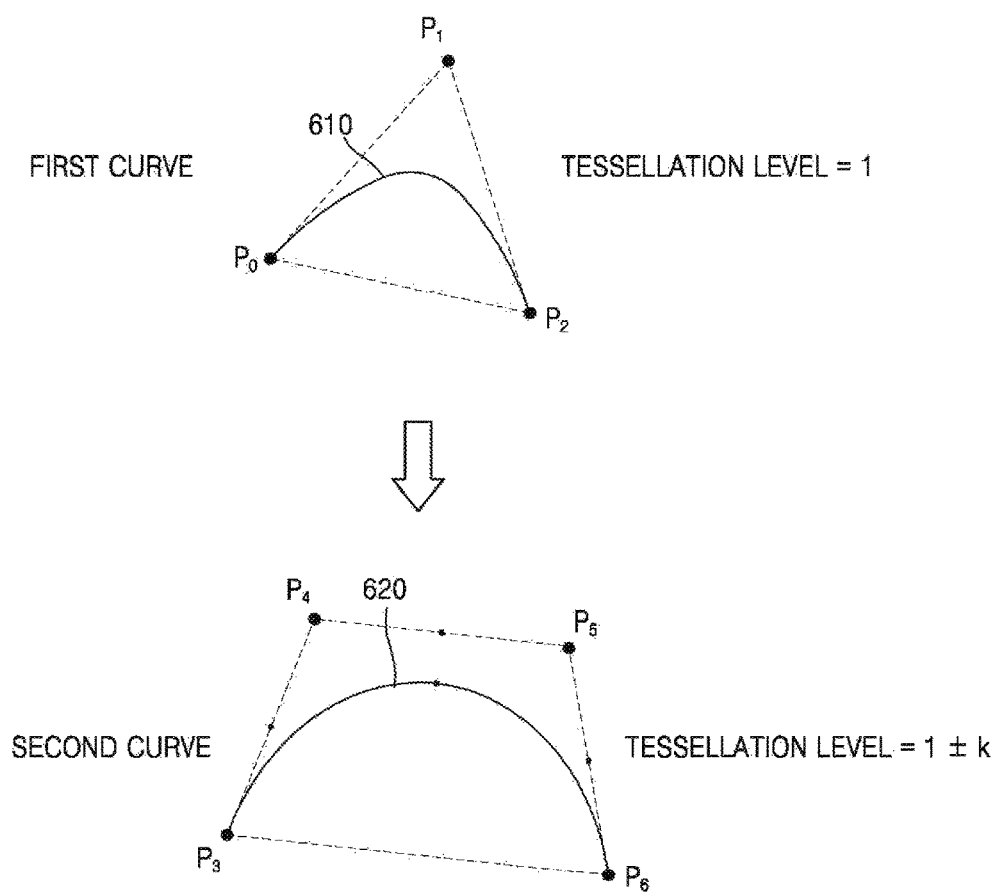
FIG. 6 is a diagram illustrating an example in which a processor determines a tessellation level when a plurality of curves are sequentially input, according to an embodiment.

FIG. 6 is a diagram illustrating an example in which a processor determines a tessellation level when a plurality of curves are sequentially input, according to an embodiment.

FIG. 6 illustrates an example in which a first curve 610 is input first and then a second curve 620 is input sequentially. For example the processor is assumed to determine the tessellation level of the first curve 610, and then determines the tessellation level of the second curve 620.

As described above with reference to FIG. 5, the processor may determine the tessellation levels of the curves 610 and 620 according to increasing or decreasing the tessellation level from a reference value, and the reference value may refer to the tessellation level of the previous curve. However, since the first curve 610 is the first-input curve, the reference value may be a specific (or alternatively, preset) value (e.g., 0).

Assuming that the processor has determined the tessellation level of the first curve 610 as 1, the tessellation level of the second curve 620 may increase or decrease by an integer k from 1. For example, k may be 1. For example, when Equation 1 is not satisfied, the processor may determine the tessellation level of the second curve 620 as 2(=1+1), and when Equation 1 is satisfied, the processor may determine the tessellation level of the second curve 620 as 0(=1−1).

The processor may store the tessellation levels of the curves 610 and 620. For example, the processor may transmit data representing the tessellation level to a memory to store the data in the memory.

Referring to FIG. 2, in operation 220, the processor may generate at least one triangle and at least two first sub-curves corresponding to the curve based on the tessellation level.

For example, the processor may generate the at least two first sub-curves and the at least one triangle by dividing the curve by using a De Casteljau algorithm.

Hereinafter, an example of dividing a curve based on a tessellation level by a processor will be described with reference to FIGS. 7 and 8.

FIG. 7 is a diagram illustrating an example in which a processor divides a curve based on a tessellation level, according to an example embodiment.

FIG. 7 illustrates an example in which a curve $C_0$ is divided when the tessellation level is 0, 1, or 2. First, when the tessellation level is 0, the curve $C_0$ may not be divided as described above.

When or if the tessellation level is 1, the curve $C_0$ may be divided one time and thus two first sub-curves $C_1$ and $C_2$ and one triangle $T_1$ may be generated. The processor may generate 'Curve_list' including information about the first sub-curves $C_1$ and $C_2$ and may generate including information about the triangle $T_1$.

When or if the tessellation level is 2, the curve $C_0$ may be divided two times and thus four second sub-curves $C_3$, $C_5$, and $C_6$ and three triangles $T_1$, $T_2$, and $T_3$ may be generated. In an example embodiment, the processor may divide the curve $C_0$ to generate first sub-curves $C_1$ and $C_2$ and may divide the first sub-curves $C_1$ and $C_2$ to generate second sub-curves $C_3$, $C_4$, $C_5$, and $C_6$. The processor may generate 'Curve_list' including information about the second sub-curves $C_3$, $C_4$, $C_5$, and $C_6$, and may generate 'Tri_list' including information about the triangles $T_1$, $T_2$, and $T_3$.

The processor may store the 'Curve_list' and the 'Tri_list'. For example, the processor may store data 'Curve_list' corresponding to the curve $C_0$ and the sub-curves $C_1$, $C_2$, $C_3$, $C_4$, $C_5$, and $C_6$ and data 'Tri_list' corresponding to the triangles $T_1$, $T_2$, and $T_3$. For example, the processor may transmit the 'Curve_list' and the 'Tri_list' to a memory to store the same in the memory.

Hereinafter, the data 'Curve_list' corresponding to the curve (or sub-curves) and the data 'Tri_list' corresponding to the triangles will be referred to as primitive data.

Hereinafter, an example of dividing a curve by a processor will be described with reference to FIGS. 8A and 8B.

Figure 8A:
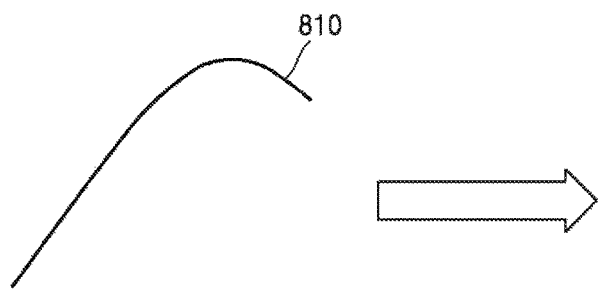
FIGS. 8A and 8B are diagrams illustrating an example in which a processor divides a curve by using a De Casteljau algorithm according to an embodiment.
Figure 8B:
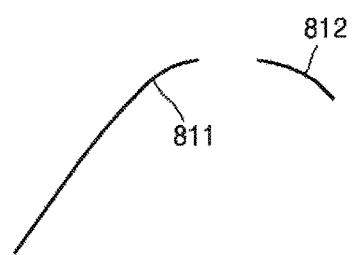

FIGS. 8A and 8B are diagrams illustrating an example in which a processor divides a curve by using a De Casteljau algorithm according to an embodiment.

FIG. 8A illustrates a curve 810 before division. Also, FIG. 8B illustrates sub-curves 811 and 812 into which the curve 810 is divided. The tessellation level of the curve 810 is assumed to be 1.

The processor may divide the curve 810 into the sub-curves 811 and 812 based on a De Casteljau algorithm. Herein, the De Casteljau algorithm may refer to an algorithm used to divide one Bezier curve into two or more Bezier curves. Detailed descriptions of the De Casteljau algorithm will be omitted herein.

Referring to FIG. 2, in operation 230, the processor may render the at least two first sub-curves and the at least one triangle.

The processor may render the curve (or sub-curves) and the triangle separately. For example, the processor may render the curve (or sub-curves) by using a Loop-Blinn method and may render the triangle by using a pipe-line of the GPU 20.

Hereinafter, an example of rendering a curve (or sub-curve) and a triangle by a processor will be described with reference to FIG. 9.

Figure 9:
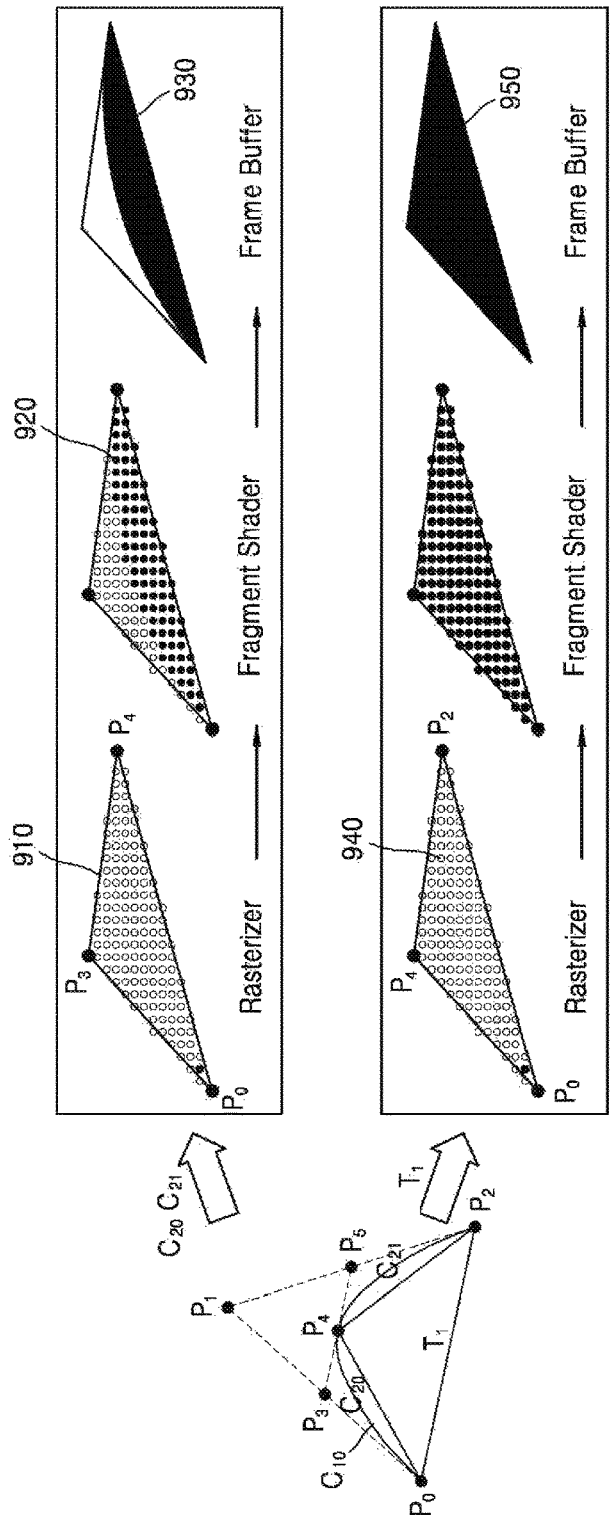
FIG. 9 is a diagram illustrating an example in which a processor renders a curve (or sub-curve) and a triangle according to an embodiment.

FIG. 9 is a diagram illustrating an example in which a processor renders a curve (or sub-curve) and a triangle according to an embodiment.

As illustrated in FIG. 9, two first sub-curves $C_{20}$ and $C_{21}$ and one triangle $T_1$ are assumed to be generated according as the processor divides a curve $C_{10}$ (tessellation level=1).

The processor may ender the first sub-curves $C_{20}$ and $C_{21}$ and the triangle $T_1$ separately. For example, the processor may render the first sub-curves $C_{20}$ and $C_{21}$ and the triangle $T_1$ by calling an OpenGL API (i.e., a Draw Call function). The processor may render the first sub-curves $C_{20}$ and $C_{21}$ by using a Loop-Blinn method and may render the triangle $T_1$ by using a pipe-line of the GPU 20. For example, a process of rendering the first sub-curves $C_{20}$ and $C_{21}$ and the triangle $T_1$ by the processor may be performed in parallel.

The processor may select candidate pixels corresponding to the first sub-curve $C_{20}$ with reference to 'Curve_list' among the primitive data. For example, as the candidate pixels, the processor may select the pixels in a triangle 910 constructed by control points $P_0$, $P_3$, and $P_4$ of the first sub-curve $C_{20}$. Then, by using a Loop-Blinn equation, the processor may select pixels 920 located inside the first sub-curve $C_{20}$ among the candidate pixels. Then, the processor may render the first sub-curve $C_{20}$ by setting the color for the pixels 920 and store the results thereof in the frame buffer.

The processor may ender the first sub-curve $C_{21}$ in the same way as rendering the first sub-curve $C_{20}$.

The processor may select pixels 940 in the triangle $T_1$ with reference to 'Tri_list' among the primitive data. Then, the processor may render the triangle $T_1$ by setting the color for the pixels 940, and may store the results thereof in the frame buffer. For example, Tri_List may be constructed in the form of GL_TRIANGLE_STRIP, and the processor may render the triangle $T_1$ by calling a draw call function.

Figure 10:
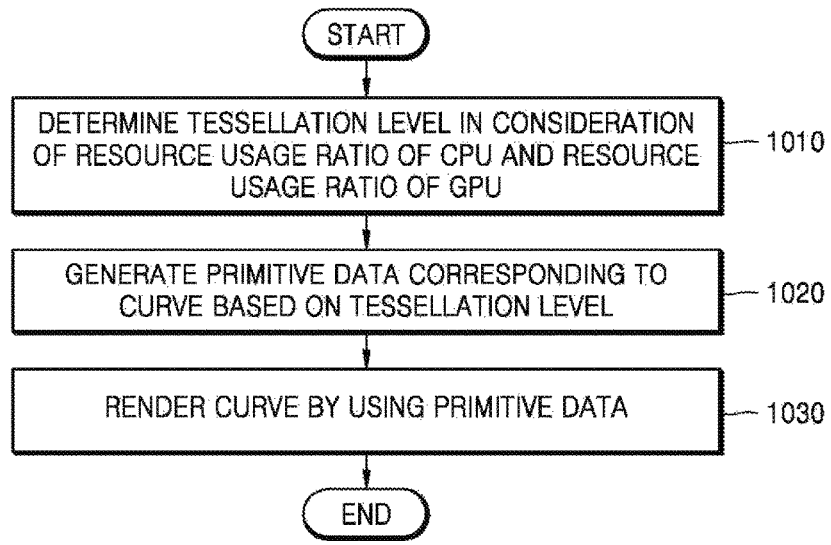
FIG. 10 is a flow diagram illustrating another example of a method of rendering a curve according to an embodiment.

FIG. 10 is a flow diagram illustrating another example of a method of rendering a curve according to an embodiment.

The method of rendering a curve illustrated in FIG. 10 may be performed by the CPU 10 or may be performed by the GPU 20. Also, the method of rendering a curve illustrated in FIG. 10 may be performed by a hardware accelerator. For example, the hardware accelerator may be embedded in the CPU 10 or the GPU 20 or may be provided as an independent device separate from the CPU 10 or the GPU 20.

Hereinafter, for convenience of description, a processor is assumed to perform the method of FIG. 10. The processor may be included in the CPU 10, the GPU 20, or the hardware accelerator.

In operation 1010, the processor may determine a tessellation level in consideration of the free resource of the CPU 10 and the free resource of the GPU 20.

The processor may decrease the tessellation level when or if the resource usage ratio $U_{CPU}$ of the CPU 10 is greater than the resource usage ratio $U_{GPU}$ of the GPU 20. The processor may increase the tessellation level when or if the resource usage ratio $U_{CPU}$ of the CPU 10 is less than or equal to the resource usage ratio $U_{GPU}$ of the GPU 20. Herein, the tessellation level may correspond to the number of times of dividing the curve. The processor may transmit the tessellation level to a memory to store the same in the memory.

An example of determining the tessellation level by the processor is the same as described above with reference to FIGS. 4 to 6.

In operation 1020, the processor may generate primitive data corresponding to the curve based on the tessellation level.

The processor may generate sub-curves and a triangle by dividing the curve by using a De Casteljau algorithm. The processor may generate 'Curve_list' including information about the curve and the sub-curves and generate 'Tri_list' including information about the triangle. The processor may transmit the primitive data ('Curve_list' and 'Tri_list') to a memory to store the same in the memory.

An example of generating the primitive data by the processor is the same as described above with reference to FIGS. 7 and 8.

In operation 1030, the processor may render the curve by using the primitive data.

The processor may render the sub-curves and the triangle separately. For example, the processor may render the sub-curves by using a Loop-Blinn method and may render the triangle by using a pipe-line of the GPU 20. For example, a process of rendering the sub-curves and the triangle by the processor may be performed in parallel.

An example of rendering a curve by the processor is the same as described above with reference to FIG. 9.

As described above with reference to FIGS. 1 to 10, the processor may determine the tessellation level adaptively according to the resource usage ratio $U_{CPU}$ of the CPU 10 and the resource usage ratio $U_{GPU}$ of the GPU 20. Thus, the occurrence of an overload in the CPU 10 and the GPU 20 may be prevented, mitigated, or reduced in likelihood of occurrence, and the curve rendering may be performed at high speed.

Figure 11:
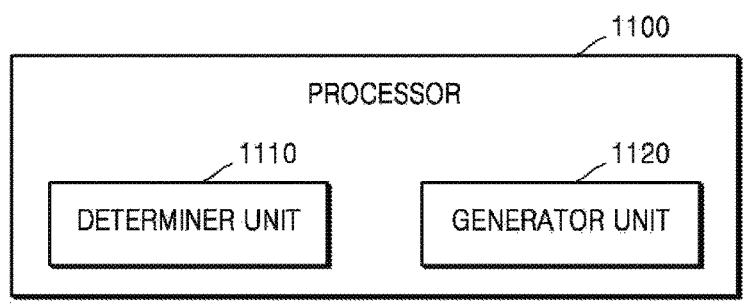
FIG. 11 is a block diagram illustrating an example of a processor according to an embodiment.

FIG. 11 is a block diagram illustrating an example of a processor according to an embodiment.

Referring to FIG. 11, the processor 1100 may include a determiner unit 1110 and a generator unit 1120. The processor 1100 may be implemented by an array of logic gates, and/or may be implemented by a combination of a general-purpose microprocessor and a memory that stores a program executable in the general-purpose microprocessor. Also, the processor 1100 may be implemented by other types of hardware.

The determiner unit 1110 may determine a tessellation level of dividing a curve based on a control point of the curve. In an example embodiment, the determiner unit 1110 may determine the tessellation level in consideration of the resource usage ratio $U_{CPU}$ of the CPU 10 and the resource usage ratio $U_{GPU}$ of the GPU 20. The determiner unit 1110 may transmit the tessellation level to a memory.

The generator unit 1120 may generate at least one triangle and at least two first sub-curves corresponding to the curve based on the tessellation level. In an embodiment, the generator unit 1120 may generate primitive data corresponding to the cu based on the tessellation level. Then, the generator unit 1120 may transmit the primitive data to a memory.

As described above with reference to FIGS. 2 to 10, a method of rendering a curve according to an embodiment may be performed by the processor; however, inventive concepts are not limited thereto. In other words, the method of rendering a curve may be performed by the CPU 10 or the GPU 20.

Hereinafter, examples of rendering a curve by the CPU 10 or the GPU 20 will be described with reference to FIGS. 12 to 15.

FIGS. 12 to 15 are block diagrams illustrating various examples of a graphics processing system according to an embodiment.

Figure 12:
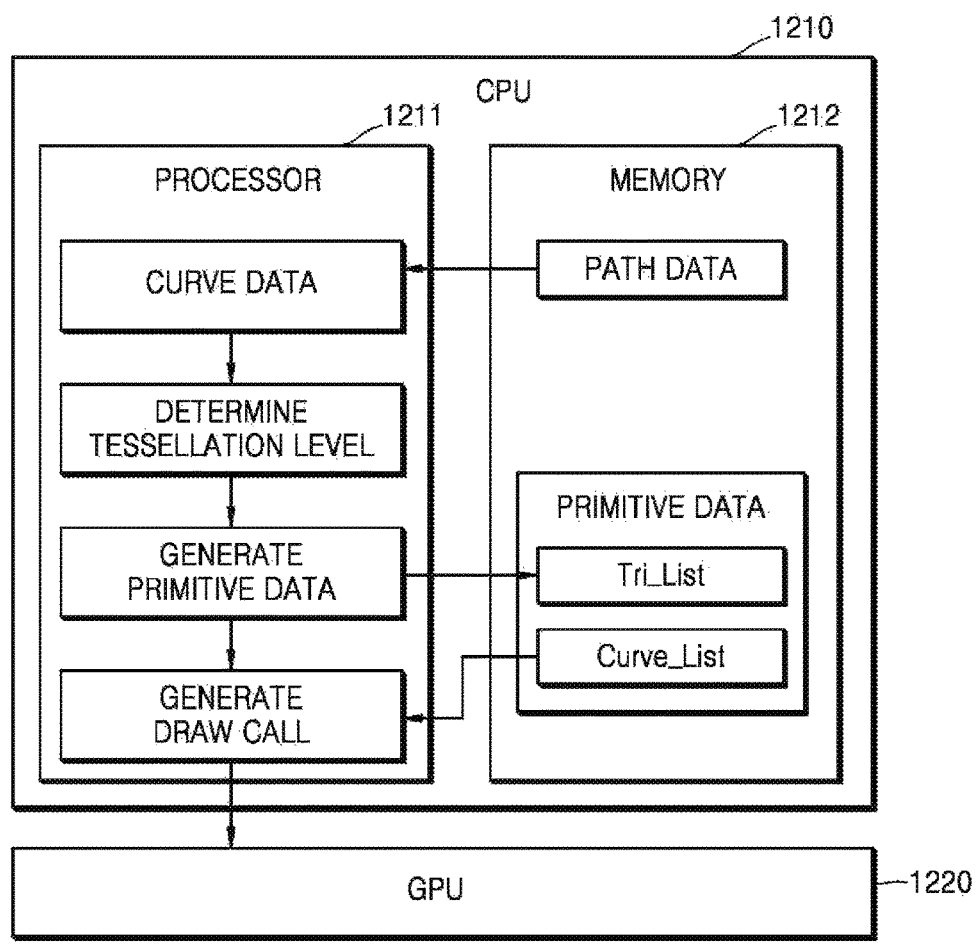
FIGS. 12 to 15 are block diagrams illustrating various examples of a graphics processing system according to an embodiment.
Figure 13:
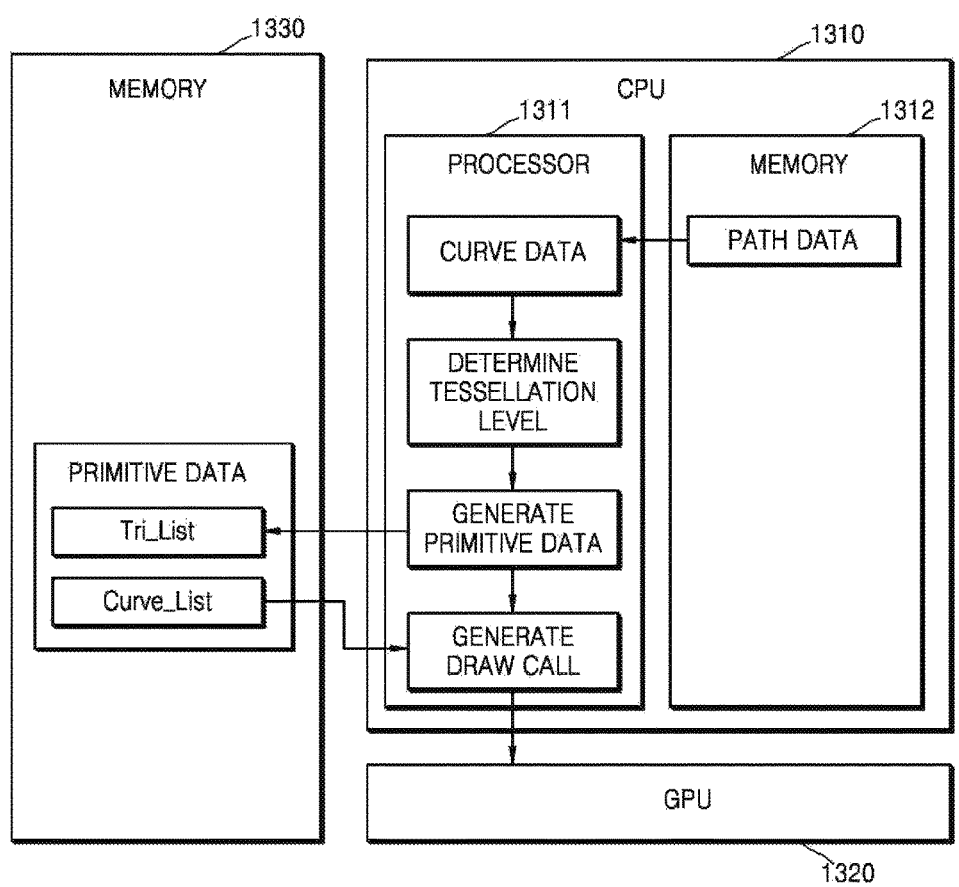
Figure 14:
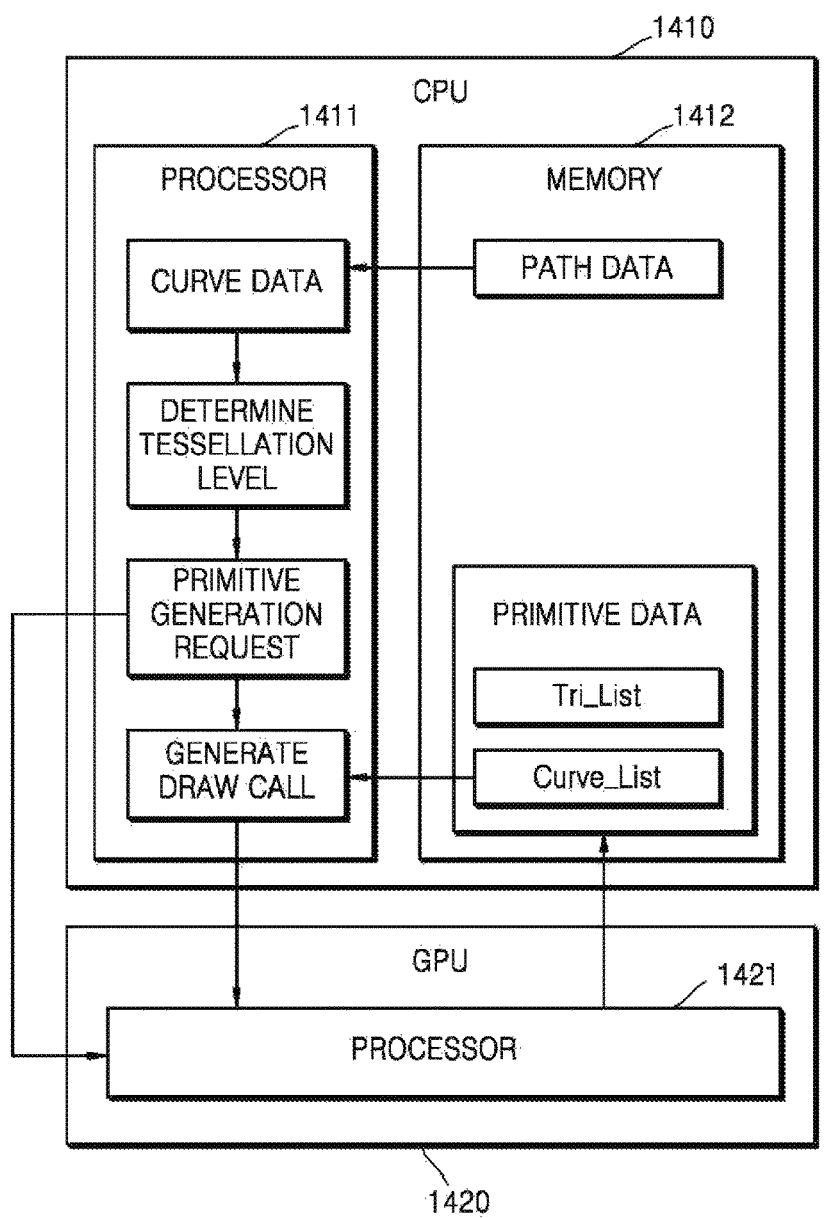
Figure 15:
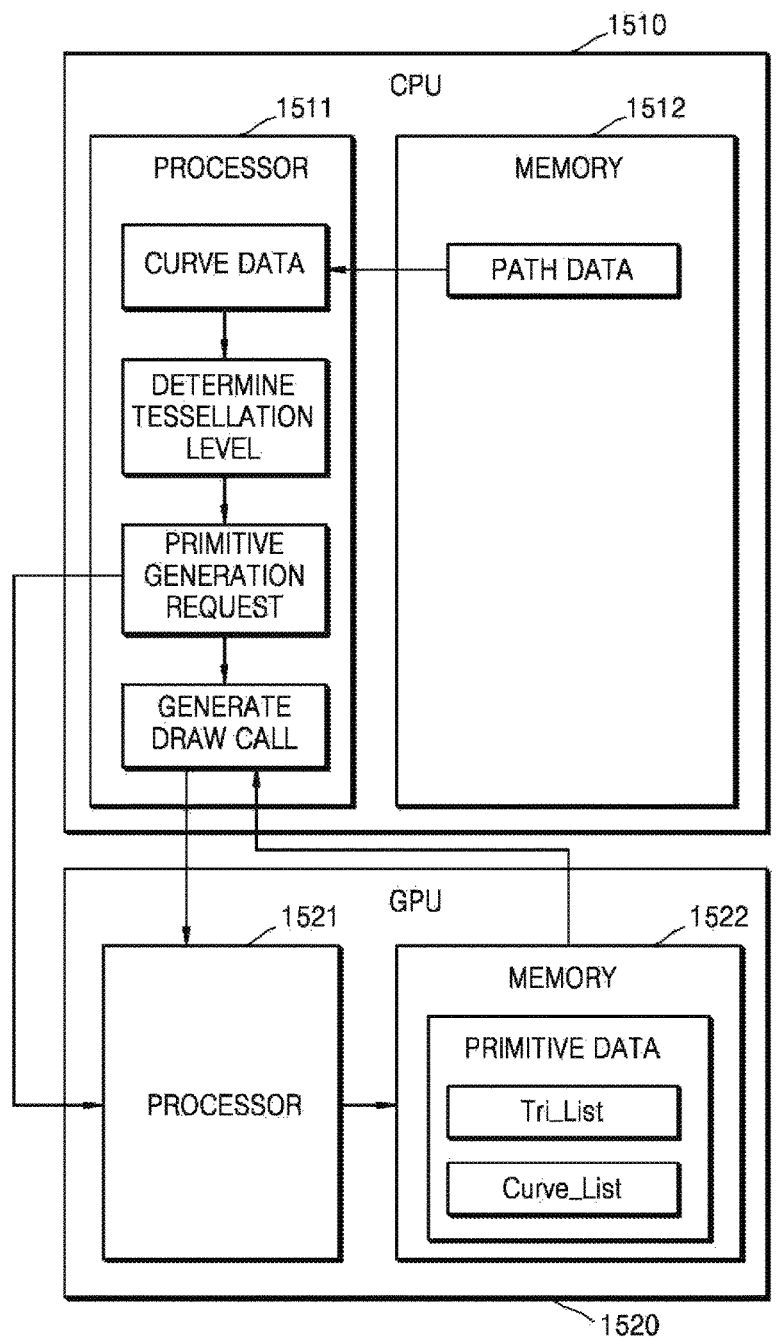

FIGS. 12 and 13 illustrate examples of generating primitive data by CPUs 1210 and 1310. FIGS. 14 and 15 illustrate examples of generating primitive data by GPUs 1420 and 1520.

Referring to FIG. 12, a processor 1211 of the CPU 1210 may determine curve data with reference to path data stored in a memory 1212. For example, the processor 1211 may determine whether a curve exists in a path. The processor 1211 may determine a tessellation level in consideration of the resource usage ratio $U_{CPU}$ of the CPU 1210 and the resource usage ratio $U_{GPU}$ of a GPU 1220. The processor 1211 may generate primitive data (Tri_List, Curve_List) by dividing the curve according to the tessellation level. Thereafter, the processor 1211 may store the primitive data (Tri_List, Curve_List) in the memory 1212. Thereafter, the processor 1211 may generate a draw call by using the primitive data (Tri_List, Curve_List), and the GPU 1220 may render a curve accordingly.

Referring to FIG. 13, the primitive data (Tri_List, Curve_List) may be stored in a memory located outside or external to a GPU 1320 and the CPU 1310. In an example embodiment, the operation performed by a processor 1311 of FIG. 13 may be the same as the operation performed by the processor 1211 of FIG. 12. However, the processor 1311 may store the primitive data (Tri_List, Curve_List) in an external memory 1330 and may generate a draw call or a command to draw by using the primitive data (Tri_List, Curve_List) stored in the external memory 1330.

Referring to FIGS. 14 and 15, an operation of determining a tessellation level by processors 1411 and 1511 may be the same as the operation of the processor 1211 of FIG. 12. However, the processors 1411 and 1511 may request the GPUs 1420 and 1520 to divide the curve based on the tessellation level (i.e., to generate the primitive data). For example, processors 1421 and 1521 of the GPUs 1420 and 1520 may generate the primitive data (Tri_List, Curve_List) by dividing the curve according to the tessellation level.

The example illustrated in FIG. 14 and the example illustrated in FIG. 15 may be different from one another in terms of the positions where the primitive data (Tri_List, Curve_List) is stored. For example, the primitive data (Tri_List, Curve_List) may be stored in a memory 1412 of a CPU 1410 or may be stored in a memory 1522 of the GPU 1520. When or if the primitive data (Tri_List, Curve_List) is stored in the memory 1522, the processor 1511 may generate a draw call by using the primitive data (Tri_List, Curve_List) stored in the memory 1522.

Although not illustrated in FIGS. 14 and 15, the primitive data (Tri_List, Curve_List) may be stored in a memory located outside the GPUs 1420 and 1520 and the CPUs 1410 and 1510.

As described above, the tessellation level may be determined adaptively according to the free resource of the CPU and the free resource of the GPU. Thus, the occurrence of an overload in the CPU and the GPU may be prevented, mitigated, or reduced in likelihood of occurrence, and the curve rendering may be performed at high speed.

The above method may be written as a program executable by a computer and may be implemented in a general-purpose digital computer that executes the program by using a computer-readable recording medium. Also, the data structure used in the above method may be written on a computer-readable recording medium through various means. Examples of the computer-readable recording medium may include storage mediums such as magnetic storage mediums (e.g., ROMs, RAMs, USBs, floppy disks, and hard disks) and optical recording mediums (e.g., CD-ROMs and DVDs).

However, those of ordinary skill in the art will understand that various changes in form and details may be made therein without departing from the spirit and scope of inventive concepts as defined by the appended claims. Thus, the described embodiments should be considered in descriptive sense only and not for purposes of limitation. Therefore, the scope of inventive concepts may be defined not by the above detailed descriptions but by the appended claims, and all differences within the scope will be construed as being included in inventive concepts.

While inventive concepts have been particularly shown and described with reference to embodiments thereof, it will be understood that various changes in form and details may be made therein without departing from the spirit and scope of the following claims.

What is claimed is:

1. A method of rendering a curve, the method comprising:
   determining a tessellation level of a curve based on a resource of a central processing unit (CPU);
   generating at least one triangle and at least two first sub-curves corresponding to the curve based on the tessellation level; and
   rendering the at least two first sub-curves and the at least one triangle,
   wherein the rendering includes rendering the at least two first sub-curves and the at least one triangle separately.

2. The method of claim 1, wherein the determining includes determining the tessellation level in consideration of a resource usage ratio of the central processing unit (CPU) and a resource usage ratio of a graphics processing unit (GPU).

3. The method of claim 2, wherein the determining includes decreasing the tessellation level in response to the resource usage ratio of the CPU being greater than the resource usage ratio of the GPU, and increasing the tessellation level in response to the resource usage ratio of the CPU being less than or equal to the resource usage ratio of the GPU.

4. The method of claim 1, wherein the generating includes generating at least one triangle and at least two Nth sub-curves corresponding to an (N−1)th sub-curve in response to the tessellation level being N, where N is a natural number greater than or equal to 2.

5. The method of claim 1, wherein the generating comprises generating the at least two first sub-curves by dividing the curve by using a De Casteljau algorithm.

6. The method of claim 1, further comprising:
   storing the tessellation level.

7. The method of claim 1, wherein the rendering includes rendering the at least two first sub-curves by using a Loop-Blinn method and rendering the at least one triangle by using a pipe-line of a GPU.

8. The method of claim 1, further comprising:
   storing data corresponding to the at least one triangle and the at least two first sub-curves.

9. A method of rendering a curve, the method comprising:
   determining a tessellation level based on a resource usage ratio of a central processing unit (CPU) and a resource usage ratio of a graphics processing unit (GPU);
   generating primitive data corresponding to a curve in response to the tessellation level; and
   rendering the curve by using the primitive data.

10. The method of claim 9, wherein the determining includes decreasing the tessellation level in response to the resource usage ratio of the CPU being greater than the resource usage ratio of the GPU, and increasing the tessellation level in response to the resource usage ratio of the CPU is smaller than or equal to the resource usage ratio of the GPU.

11. The method of claim 9, wherein the tessellation level corresponds to a number of times of dividing the curve.

12. The method of claim 9, wherein the determining includes determining a tessellation level of a second curve according to increasing or decreasing a tessellation level of a first curve,
   wherein the first curve includes a curve with a tessellation level determined before the second curve.

13. The method of claim 9, wherein the primitive data includes at least one of curve data and triangle data.

14. The method of claim 9, wherein the generating includes generating the primitive data by dividing the curve using a De Casteljau algorithm.

15. The method of claim 9, wherein the rendering includes performing at least one of a rendering based on a pipe-line of the GPU, and a rendering based on a Loop-Blinn method by using the primitive data.

16. The method of claim 9, further comprising:
storing the tessellation level.

17. The method of claim 9, further comprising:
storing the primitive data.

18. A method of rendering a curve, the method comprising:
determining a first tessellation level in response to a resource usage ratio of a first processing unit being greater than a resource usage ratio of a second processing unit times a scaling value, the scaling value being a real number greater than 0; and
determining a second tessellation level, different from the first tessellation level, in response to the resource usage ratio of the first processing unit being less than or equal to the resource usage ratio of the second processing unit times the scaling value.

19. The method of claim 18, wherein the first processing unit includes a central processing unit and the second processing unit includes a graphics processing unit.

* * * * *